Jan. 7, 1930. H. G. EISLER 1,742,463

RHEOSTAT

Filed March 5, 1924

Inventor:
Henry G. Eisler.
By Curtis B. Camp
Attorney.

Patented Jan. 7, 1930

1,742,463

UNITED STATES PATENT OFFICE

HENRY G. EISLER, OF WILMETTE, ILLINOIS, ASSIGNOR TO KELLOGG SWITCHBOARD AND SUPPLY COMPANY, OF CHICAGO, ILLINOIS, A CORPORATION OF ILLINOIS

RHEOSTAT

Application filed March 5, 1924. Serial No. 696,925.

My invention relates to rheostats for varying the resistance in an electric circuit and is particularly adapted for use in controlling the filament of electron tubes and an object of my invention is to provide a rheostat which is simple in construction and operation but very durable and efficient.

Rheostats of the type employed for controlling the current flow through the filament of an electron tube are usually provided with a contact wiper and when the rheostat is operated to increase or decrease the amount of resistance in the circuit in which the rheostat is used, the increase or decrease in the amount of resistance is effected by a complete turn or several turns of the convolutions of the resistance coil. This means of adjustment is objectionable in that it is difficult in some instances to obtain the proper amount of resistance in the operating circuit and to overcome this objectionable feature I have designed an improved rheostat and a feature of my invention is the provision of a vernier attachment in the form of a predetermined length of wire (approximately equal to one and one half turns of the main resistance element) in series relation with the resistance coil of the rheostat and an auxiliary wiper associated therewith.

Another feature of my invention is the method of controlling the movement of the wiper associated with the vernier portion of wire to place the same in contact therewith, and the movement of the wiper associated with the main resistance unit. The movement of the wiper of the resistance unit and the wiper of the vernier wire is under the control of a single rotatable unit, which after having been moved a certain degree may be rotated in either direction a limited distance without affecting the movement of the wiper associated with the main resistance coil and bring about the movement of the wiper associated with the vernier wire to further increase or decrease the resistance.

The above features, as well as others, will be more particularly pointed out in the ensuing specification, and for a more complete understanding of the features of my invention reference may be had to the accompanying drawing, in which like reference characters in the several views denote like parts and in which, Fig. 1 is a front view of the rheostat of my invention illustrating the same in its normal or off position;

Figure 2:
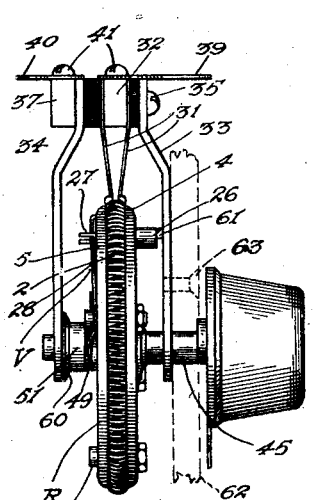
Fig. 2 is a left side view of Fig. 1.
Figure 1:
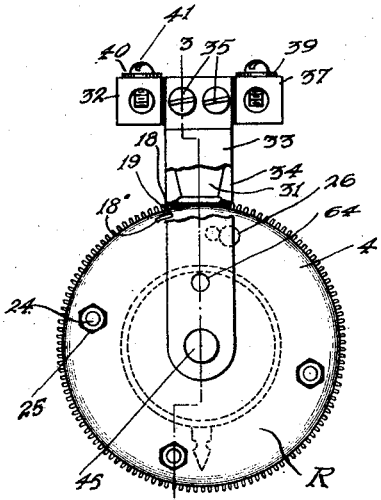
Figure 3:
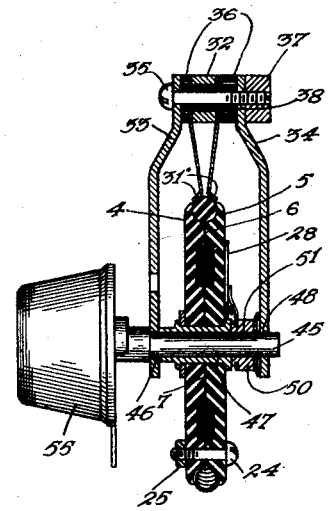
Fig. 3 is a sectional view along the line 3—3 of Fig. 1.

Referring now more in detail to my invention as illustrated in the accompanying drawing, the rheostat of my invention comprises a helical wound resistance unit 2 of a predetermined resistance constructed of suitable resistance material and formed of a plurality of turns or convolutions 3. The rotatable supporting element which carries the resistance unit 2 comprises a pair of disks 4 and 5 moulded of suitable insulating material such as bakelite, the inner faces 6 and 7 of which are provided with integrally formed hub portions 8 and 9, annular ring portions 10 and 11 and annular arcuate grooves 12 and 13 at their outer edges. The disks 4 and 5 are assembled to form the rotatable element R by placing the inner faces 6 and 7 of the disks 4 and 5 together and securing them in matched relation with each other by means of a sleeve member 14 which extends through aligned central orifices 16 in the hub portions 8 and 9 of the disks 4 and 5, the protruding end of which is upset by suitable means to secure the disks 4 and 5 together and also hold the sleeve 14 in said orifices 16 against movement. The arcuate grooves 12 and 13 of the disks 4 and 5 form when the said disks 4 and 5 are assembled as just described, an annular circular channel 17, which contains the helical resistance unit 2 which is placed therein during the assembly of the disks 4 and 5 to form the rotatable unit R. The end 18 of the resistance unit 2 is secured to the disk 4 by extending through a suitable orifice 19 in the said disk 4 and its protruding end 18' is bent over. The end 20 of the resistance unit 2 passes through a suitable orifice 21 in the disk 5 and its end 20' which extends through the orifice 21 in the disk 5 forms the vernier resistance unit wire 28 of the rheostat and is of a length equal to approximately one and one half turns or convolutions of the resistance unit 2 and is suitably secured as will presently be described.

The thickness of the disks 4 and 5 through the annular ring portions 10 and 11 is slightly less than the thickness through hub portions 8 and 9 so that when the disks 4 and 5 are assembled to form the rotatable resistance carrying unit R there is formed a slight gap 22 between the plane surfaces of the respective ring portions 10 and 11 due to this slight difference of thicknesses between the said ring portions 10 and 11 and hub portions 8 and 9 of the respective disks 4 and 5. Aligned orifices 23 in the disks 4 and 5 receive screws 24 and nuts 25 having screw threaded engagement with the screws 24 are turned down. Due to the slight gap 22 between the plane surfaces of the ring portions 10 and 11 of the disks 4 and 5, as the nuts 25 are turned down the faces 6 and 7 of the disks 4 and 5 are drawn together and as the helical wound resistance unit 2 is of the same diameter as the diameter of the annular circular channel 17 formed by the annular arcuate grooves 12 and 13 of the assembled disks 4 and 5 this slight movement of the outer portion of the disks 4 and 5 in closing the gap 22 securely clamps the helical resistance unit 2 in the annular channel 17. An insulating member 29 is also clamped in the channel 17 and separates the ends 18 and 20 of the helical resistance unit 2 and also is engaged by the wipers associated with the resistance unit 2 when the unit R which carries the resistance unit 2 is in its normal position. A pin member 26 extends through a pair of aligned orifices 23 in the disks 4 and 5 and secured therein in any suitable manner, as that of upsetting its protruding end. The pin member 26 is provided with a reduced end 27 which extends through the orifice 23 in the disk 5 and which is bifurcated and the end 20' of the resistance unit 2 which forms the vernier unit wire 28 of the vernier portion V of the rheostat rests in this bifurcated end 27. The free end of the vernier wire 28 is secured in position under the head of the clamping screw 24 and this portion 28 of the resistance unit 2 which is stretched between the bifurcated end 27 of the pin 26 and the screw 24 forms the vernier unit V of the rheostat.

A pair of contact wipers 31 are provided for engaging the helical resistance unit 2 and are separated by means of a suitable terminal block 32. A pair of mounting legs 33 and 34 are provided between which the terminal block 32 and contact wipers 31 are clamped by means of suitable clamping screws 35, the said terminal block 32 and wipers 31 being suitably insulated from the mounting legs 33 and 34 by means of insulating strips 36. The clamping screws 35 pass through suitable orifices in the legs 33 and 34, terminal block 32 wipers 31 and insulation strips 36 and have screw threaded engagement with suitable tapped orifices in a terminal block 37, the said screws 35 being suitably insulated from the block 32 and wipers 31 by suitable insulating bushings 38. Suitable terminals 39 and 40 are secured to the terminal blocks 32 and 37 by means of the screws 41 to which the leads of an external circuit may be soldered.

The unit R and its supported parts as a whole are rotatably supported between the legs 33 and 34 and to position the same so as to be rotatably supported the unit R is inserted between the legs 33 and 34 with the insulating member 29 inserted between the free ends 31' of the wipers 31. A shaft 45 is now inserted through an orifice 46 in the leg 33 and through the central orifice 47 in the sleeve 14 and through an orifice 48 in the leg 34. The wiper 49 associated with the vernier unit V is secured to a sleeve member 50 in any suitable manner, the sleeve 50 being provided with a central orifice 51 through which the shaft 45 extends. The sleeve 50 and its supported wiper 49 rests between the sleeve 14 and the leg 34 and is secured to the shaft 45 by means of a suitable set screw 52 which prevents removal of the shaft 45. The orifices 46 and 48 in the legs 33 and 34 serve as bearings in which the shaft 45 rotates and to facilitate the rotation of the shaft 45 a suitable knob 55 is supported on the shaft 45 in any suitable manner.

Figure 4:
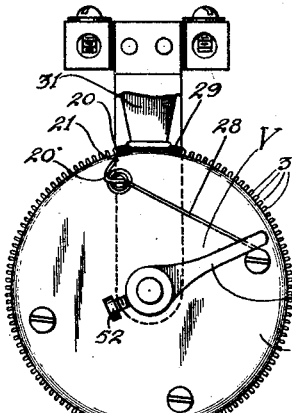
Fig. 4 is a back plan view of the rheostat illustrating the vernier portion of the rheostat in its off or normal position.
Figure 6:
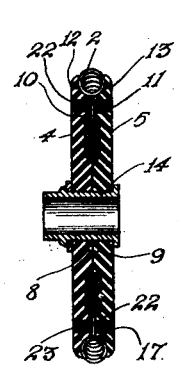
Fig. 6 is a sectional view of the rotatable resistance supporting element which supports the main resistance unit illustrating the resistance unit position on the supporting element but before being clamped into position.

Having described the apparatus which comprises the rheostat of my invention, I will now describe in detail the operation of the rheostat and its vernier unit V. As illustrated in Fig. 4 the resistance unit R and its supported helical resistance 2 and vernier wiper 49 are in their normal or off position with the wipers 31 engaging the insulating separator 29. To move the rheostat off normal the actuating knob 55 is grasped and turned in a counter clockwise direction with reference to Fig. 4 and as the knob is secured to the shaft 45 the said shaft 45 is also rotated. The sleeve 50 which carries the vernier wiper 49 is also secured to the shaft 45 by means of the set screw 52 and is also rotated in a counter clockwise direction causing the wiper 49 to wipe over the vernier unit wire 28. This rotation of the shaft 45 and the vernier wiper 49 does not affect the unit R as it is loosely supported on the shaft 45 and the continued rotation of the shaft 45 causes the vernier wiper 49 to wipe over the vernier wire 28 until the wiper 49 engages the pin extension 27 of the pin 26 which limits the movement of the vernier wiper 49 in this direction. Further rotation of the shaft 45 now causes the unit R to rotate causing the insulating member 29 to disengage the wipers 31 and place the convolutions 3 of the resistance unit 2 in engagement with the wipers 31. As the knob 55 is rotated the unit R is also rotated and successive convolutions 3 of the resistance 2 pass between the wipers 31 causing the resistance of the electrical circuit in which the rheostat is used to be decreased and when the proper coarse adjustment is obtained, a finer adjustment may be obtained by the use of the vernier unit V of the rheostat of my invention.

In a circuit in which a rheostat is used to control the current flow through the filament of an electron tube there is a critical point at which the tube will function at its maximum efficiency and that point is obtained by being able to adjust the resistance in the circuit so that just the proper amount of resistance may be cut in or out to obtain this maximum efficiency. Now when the rheostat of my invention has been adjusted as above described to place the resistance 2 in position between the wipers 31 so that the approximate amount of resistance has been cut in the circuit I provide the vernier unit V whereby the wiper 49 of the vernier unit V may be rotated in a clockwise or counter-clockwise direction to further increase or decrease the resistance until just the right amount of resistance is cut in the circuit as will now be described. After the unit R has been adjusted to approximately cut in the proper amount of resistance 2 between the wipers 31, the knob 55 may be rotated in a clockwise direction with reference to Figs. 4 and 5, through approximately ninety degrees of rotation without disturbing the adjustment of the rotatable unit R as it is loose upon the shaft 45 and as the wiper 49 of the vernier unit V is fixed to the shaft 45 as before described the clockwise rotation of the shaft 45 causes the wiper 49 to rotate in this direction and wipe over the wire unit 28 of the vernier unit V. The distance traveled by the wiper 49 over the wire 28 in its clockwise direction through its ninety degrees of rotation may be approximately the length of one and one half convolutions of the resistance unit 2 so that it may readily be seen that as the wiper 49 is moved over the wire 28 in this clockwise direction it may be placed in an infinite number of positions on that portion of the wire 28 that is covered by the wiper 49 in its course of travel in its ninety degrees of clockwise rotation. It is also readily apparent that the wiper 49 of the vernier unit V may be rotated in either a clockwise or counterclockwise direction in this ninety degrees without disturbing the adjustment of the unit R.

Figure 5:
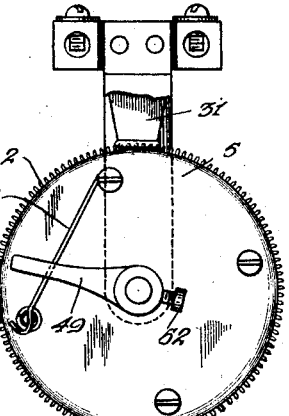
Fig. 5 is a view similar to Fig. 4 illustrating the wiper of the vernier portion of the rheostat and the wipers of the main resistance unit in an advanced or off normal position.
Figure 7:
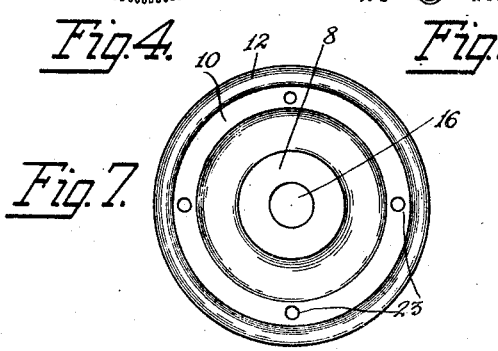
Fig. 7 is a plan view of one of the disk members.

If the rotatable unit R and its supported resistance 2 is rotated between the wipers 31 beyond the approximate point of the proper amount of resistance to be used, the knob 55 is turned in a clockwise direction with reference to Figs. 4 and 5 causing the shaft 45 to also rotate in a clockwise direction until the wiper 49 of the vernier unit V engages the screw 24. Further rotation of the shaft 45 in this direction after the wiper has engaged the screw 24 causes the unit R to be rotated in a clockwise direction causing the successive convolutions 3 of the resistance unit 2 to pass through the wipers 31 until the approximate amount of resistance is cut in and to obtain a finer adjustment the shaft 45 may now be rotated in a counter clockwise direction through ninety degrees of rotation to permit the wiper 49 of the vernier unit V to wipe over the portion of the wire 28 covered by the degree of rotation of the wiper 49.

The wipers 31 which engage the convolutions 3 of the resistance 2 are tensioned so that their free ends 31' normally touch and when the unit R is inserted between the legs 33 and 34 with the insulating member 29 between the free ends 31' of wipers 31 the said wipers 31 are spread or forced apart against their normal tension causing them to firmly engage the insulating member 29 when the unit is in its normal or off position or firmly engage the convolutions 3 of the resistance unit 2 when the same passes between the wipers 31 as it is rotated to an adjusted position. This tension of the free ends 31' of the wipers 31 insures a perfect electrical contact between the wipers 31 and resistance 2 and also holds the unit R in any of its adjusted positions. The wiper 49 of the vernier unit V is also provided with frictional holding means for holding the wiper 49 in any of its adjusted positions and this holding means is in the form of a dished washer 60 which is inserted between the sleeve 50 to which the wiper 49 is secured and the inner face of the leg 34. This dished washer 60 has a spring effect and holds the wiper 49 in any of its adjusted positions. The unit R is limited in its off position by means of a pin 61 which is secured to the leg 33 and is engaged by the pin 26 secured to the unit R as before described and when the unit R is restored to its normal or off position the pin 26 engages the pin 61 secured to the leg 33 to limit the movement of the unit R in that direction. When the unit R is moved to its extreme "on" position the pin 26 secured to the unit R engages the pin 61 secured to the leg 33 and limits the movement of the unit R in this direction.

In Fig. 2 I illustrate the rheostat mounted upon a panel 62 shown in dotted lines by means of a screw 63 which extends through a suitable orifice in the panel and has screw threaded engagement with a suitable tapped orifice 64 in the leg.

While I have described a preferred embodiment of my invention, it is to be understood that I do not wish to be limited to the exact structure as shown and described, as changes and modifications will readily suggest themselves, and I therefore aim to cover all such changes and modifications as come within the spirit and scope of the appended claims.

What I claim as new and desire to secure by United States Letters Patent is:

1. A device of the character described including a pair of members forming a U-shaped supporting frame, a rotatable shaft supported in orifices in the depending ends of said supporting frame, a resistance element comprising a plurality of convolutions of conducting material, a rotatable supporting member consisting of a pair of disks having integrally formed inwardly extending hub portions and ring portions and provided with arcuate shaped peripheries, a sleeve member loosely supported on said shaft and extending through orifices in said hub members having an end and an intermediate portion upturned along the outside edges of said disks to form a unitary structure, the other end of said sleeve member bearing against one of said depending members to space said disks from said member, said hub members engaging each other to separate the ring portions and arcuate shaped peripheries to form a channel large enough to permit the insertion of the resistance element and means for closing the gap between the ring portions and reducing the channel to cause the peripheries of said disks to grasp said resistance element and secure the same in said channel, one end of said resistance element extending through one of said disks of said supporting member in parallel relation with the face of said disk to form a second resistance element, means extending through said disks for securing said second resistance element at its ends thereof to said disk, a plurality of contact members, a pair of said contact members being adapted to engage said first resistance element and another of said contact members being adapted to engage said second resistance element and movable independently of said pair of contact members a predetermined distance.

2. A device of the character described including a pair of members forming a U-shaped mounting frame, a rotatable shaft supported in said frame, a resistance element comprising convolutions of conducting material, a rotatable supporting member consisting of a pair of disks having integrally formed inwardly extending hub portions and an annular ring member intermediate of said hub portions and the peripheral edges of said disks, said peripheral edges being arcuate in shape, a sleeve extending through said hub portions and loosely supported on said shaft, said sleeve having an end and an intermediate portion upturned along the outside edges of the disks to form a unitary structure, said other end of said sleeve forming spacing means for said disks and frame, said hub members engaging each other to separate the ring portions and arcuate shaped edges to form a channel large enough to receive said resistance element, means for closing a gap between the ring portions and reducing the channel to cause the peripheral edges to grasp the said resistance element and secure the same in said channel, one end of said resistance element extending through one of said disks and in parallel relation with the face of said disk to form a second resistance element, means extending through said disks for securing said resistance element at its ends thereof to said disk, said means extending beyond the face of said disk, a pair of contact members adapted to engage said first resistance element, a wiper member rotatably secured to said shaft adapted to engage said second resistance element, said wiper being movable over said second resistance element, without effecting movement of said first resistance and then engaging the extending portions of said securing means to effect movement of said first resistance element.

3. A device of the character described including a mounting frame, a rotatable shaft supported by said frame, a convolute resistance element, a rotatable supporting member consisting of a pair of disks having integrally formed inwardly extending hub portions and an annular ring member intermediate said hub portions and the peripheral edges of said disks, said edges being arcuately shaped, a sleeve member loosely supported on said shaft and extending through said hub portions and having portions upturned along the outside faces of the disks to form a unitary structure, said hubs engaging each other to separate the ring portions and arcuate shaped edges of said disks to form a channel large enough to receive said convolute resistance element, means for closing said gap between the ring portions and reducing said channel to cause said edges to grasp said convolute resistance element to secure the same in said channel, one end of said resistance element extending through one of said disks to form a second resistance element in parallel relation with the face of said disk, certain of said closing means securing said second resistance element at its ends to said disk, one of said means preventing the excessive rotation of said supporting member, a pair of contacts for engaging said first resistance element, a wiper for engaging said second resistance element and engaging said means for securing said resistance element to cause the rotation of said supporting disks, said wiper adapted to move over said second resistance element without causing movement of said rotatable disks.

4. In a rheostat, the combination of a fixed contact, a rotatable supporting member comprising a pair of disks having integrally formed inwardly extending hub portions and an angular ring member intermediate of said hub portions and the peripheral edges of said disks, said peripheral edges being arcuately shaped, a sleeve for securing said disks together to form a unitary structure, said hub portions engaging each other to separate said ring portions, and said arcuate edges to form a channel, a resistant member mounted in said channel on said disks to turn therewith into electrical engagement with said fixed contact, means for closing said gap between said ring portions and said channel to cause said arcuate shaped edges of said disks to grasp said resistant element to secure the same in said channel, one end of said resistant element extending through one of said disks and in parallel relation with the face of said disk to form a vernier resistant element, certain of said means for closing said gap securing said vernier resistant element at its ends to said disk, one of said means preventing the excessive rotation of said disks, a contact movable along said vernier resistant element and adapted at the end of its movement in one direction to engage one of said securing means and at the end of its movement in the other direction to engage the other of said securing means and to act through said means to rotate the disks.

Signed by me at Chicago, county of Cook and State of Illinois, this 3d day of March, 1924.

HENRY G. EISLER.